UNITED STATES PATENT OFFICE.

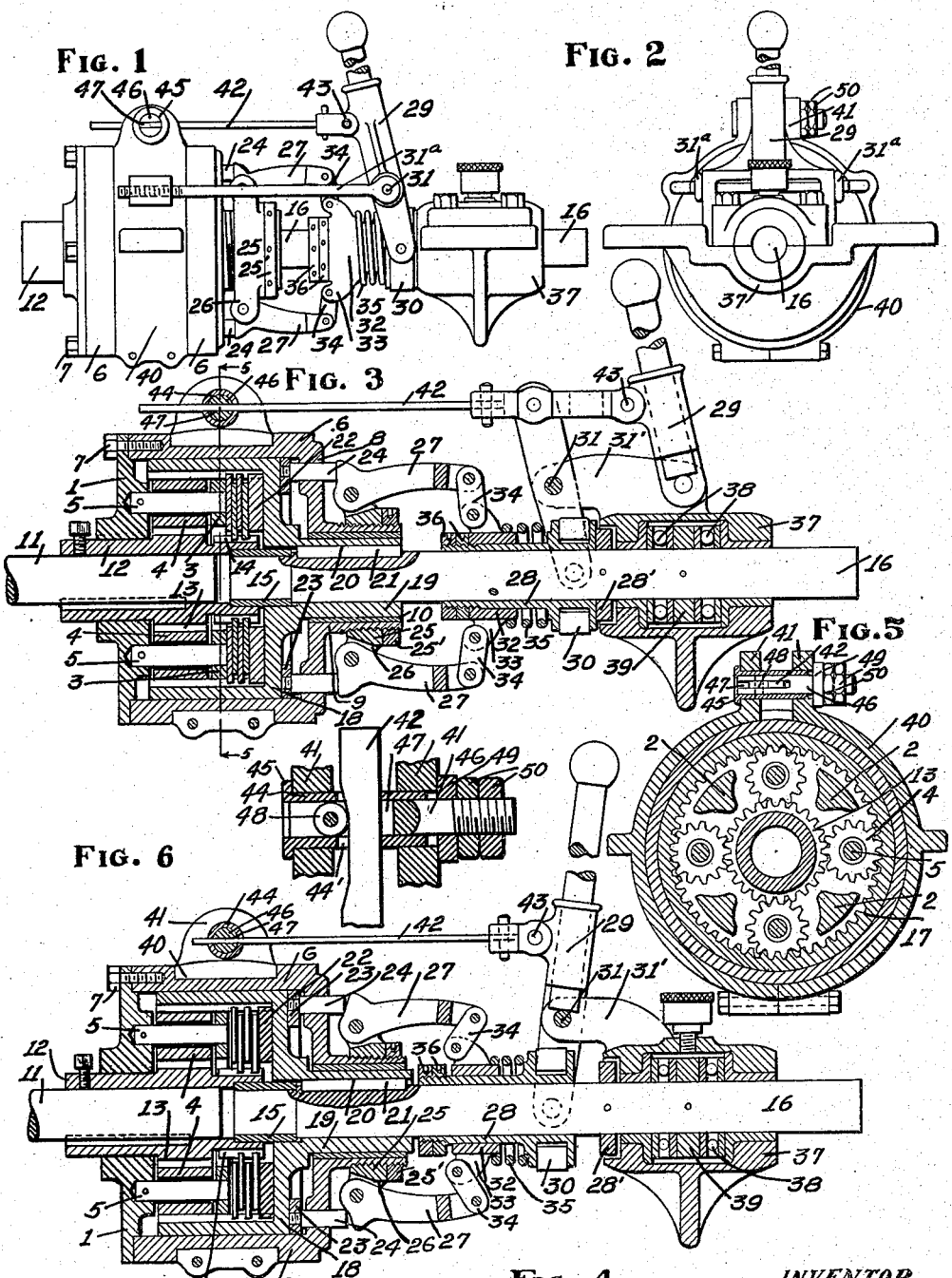

HARRY J. PERKINS, OF GRAND RAPIDS, MICHIGAN.

REVERSE-GEAR MECHANISM.

1,166,479. Specification of Letters Patent. Patented Jan. 4, 1916.

Application filed March 15, 1915. Serial No. 14,363.

*To all whom it may concern:*

Be it known that I, HARRY J. PERKINS, a citizen of the United States, residing at Grand Rapids, Michigan, have invented certain new and useful Improvements in Reverse-Gear Mechanism, of which the following is a specification.

This invention relates to reverse gear mechanism.

The objects of my invention are: First, to provide an improved construction wherein on the direct drive there will be no strain or work on the reverse gears or on the teeth of the pinions thereof. Second, to provide an improved means for holding the gear cage or drum on the reverse. Third, to provide in a compact structure of the class described a large frictional area in the clutch. Fourth, to provide improved combined gear and clutch structures. Fifth, to provide an improved means of securing the neutral shift.

Further objects, and objects relating to details and economies of construction and operation will definitely appear from the detailed description to follow.

I accomplish the objects of this invention by the devices and means described in the following specification.

The invention is clearly defined and pointed out in the claims.

A structure constituting a preferred embodiment of my invention is clearly illustrated in the accompanying drawing forming a part of this specification in which:

Figure 1 is a side elevation showing simplicity of construction, control lever connected by bracket from brake band, complete in itself, ready to install. Fig. 2 is an end elevation showing lugs or supporting arms on each side of the drum and rear bearing for supporting to the bed plate. Fig. 3 is a longitudinal vertical section on center line of shaft, showing the mechanism compressed together and the disk securely locked as a solid coupling forward motion or direct drive. Fig. 4 is a longitudinal vertical section on center line of shaft showing the drum held at rest, or from revolving by lock on top of brake band as in reverse motion or backing up. Fig. 5 is a transverse section of the reversing planetary gearing and brake band center lock between two lugs on brake band, also showing the bridge in gear case between the pinions to hold as a solid piece to the two pinion bearings, section taken on Fig. 3. Fig. 6 is an enlarged detail sectional view on line 6—6 of Fig. 5, showing the band clutching means.

In the drawing similar numerals of reference refer to similar parts throughout the several views, and the sectional views are taken looking in the direction of the little arrows at the ends of the section lines.

Considering the numbered parts of the drawing, 1 is the gear cage having bridge bars 2 connected to the inner ring 3, making it substantially a one piece structure. The pinions 4 are carried on pins 5. The case 6 forms a drum, one head of which is formed by the gear cage 1 which is secured thereto by bolts or cap screws 7, and the opposite head 8 is integral and extends into a hub 9 provided with a suitable bushing 10 within which revolving parts are journaled. The driving shaft 11 is keyed or otherwise secured to the hub 12 which is journaled in the gear cage 1. A spur gear 13 is formed on this hub that meshes with the pinions 4. The inner end of the hub is formed with teeth 14, like spur gears, to engage the clutch disks. Within the inner end of the hub 12 is a bronze bushing 15 into which the end of the driven shaft 16 is journaled, thereby keeping the driving and driven shafts in alinement and providing a thrust bearing for the hub of the driving shaft.

An internal gear 17 embraces and meshes with the pinions 4, the toothed part being considerably longer than the length of the said pinions for a purpose hereafter to be mentioned. The crown 18 of the said gear extends into a hub 19 and is provided with a key way 20 which is engaged by a key or feather 21 on the said shaft, whereby the said internal gear may be shifted longitudinally. The portion of the teeth of said gear nearest the crown are provided for engaging disk members of a clutch, and the entire gear 17 is adapted to slide axially within the case 6, the said gear fitting a bore within the case so that it is effectively guided in position. An annular plate 22 is disposed within the internal gear next its crown in precisely parallel position to the ring 3. The plate 22 is put in as an expedient of manufacture to fill up the gear at this point, it not being practical to make the structure integral and cut the teeth clear to the crown with the usual gear cutter.

Between the plate 22, or the crown of the gear when the plate is absent, and the ring 3

I dispose a disk clutch, the alternate disks being notched to engage the internal gear and the teeth 14 on the end of the hub, as many disks being made use of as are necessary for the proper manipulation under the power specified. The disks are cut on their peripheries like spur gears to engage the internal gear all the way around, and the alternate disks are cut like internal gears to engage the teeth 14 on the hub, so that there is very intimate connection between the disks and the parts to be clutched.

Disposed within the case 6 is a bearing ring 23 to form a bearing surface for the outside of the crown of the gear 17, and this carries axially disposed thrust pins 24 whereby pressure is put upon the internal gear when it coacts with the other parts in clutching. On the hub 9 I secure adjustably by screw threads a ring 25 having oppositely projecting ears 26 on which are pivoted a pair of levers 27 so disposed as to exert pressure on the thrust pins 24. A lock nut 25' is provided to lock the same when adjusted.

A sliding sleeve 28 is on the driven shaft 16 and is actuated by the control lever 29, which is forked in the usual manner and secured to the collar 30 on the said sleeve and is fulcrumed at 31. On the sleeve 28 is a loosely fitting collar 32 with oppositely projecting ears 33 which are connected by links 34 to the ends of the levers 27 respectively. A coil spring 35 surrounds the sleeve 28 and holds the collar 32 yieldingly in position. Lock nuts 36 form an adjustable stop on the inner end of the said sleeve 28.

A bearing block 37 carries a suitable ball thrust bearing 38 which engages the thrust collar 39 on the driven shaft 16 which prevents axial movement thereof and holds the shaft to its work. A stop collar 28' on driven shaft 16 is provided for the sleeve 28. Brackets 31' are provided on the bearing block 37 to carry the fulcrum 31 of the control lever 29. The fulcrum 31 of this control lever can be carried by rods 31ᵃ secured to the brake bands, as illustrated in Fig. 1, and the lever may be compound, as illustrated in Fig. 3.

The brake band 40 which embraces the shell of the case 6 is made of two parts having upwardly projecting lugs 41 at the top between which extends the thrust bar 42 which is pivoted at 43 to the control lever 29. The lugs 41 are perforated and are coupled together by a sleeve member 44 having a suitable head 45 within which is disposed a pin 46 which is slotted at its inner end at 47 and provided with an anti-friction roller 48. The sleeve 44 is correspondingly slotted at 44'. The outer end of the pin 46 is provided with a collar 49 and lock nuts 50 are screw threaded on said pin as an adjusting means. The thrust bar 42 is disposed between the lugs 41 and has an inclined surface or cam surface, which engages the anti-friction roller 48, and the opposite side is straight and plays against the opposite end of the slot 44' so that on manipulation of the control lever 29 the brake band 40 is either released or clamped, depending on the direction of movement of the lever.

The various parts having thus been described in detail, their operation will be readily understood.

When the control lever 29 is thrown forward to the position indicated in Fig. 3, the sleeve 28 is moved to the rear and actuates the toggle formed by the links 34, thereby actuating the levers 27 and closing the clutch and releasing the brake band, so that the power is transmitted to the driven shaft direct. When the control lever 29 is moved to the rear, as indicated in Fig. 4, the brake band is clamped upon the case, the sleeve 28 is carried forward and acts upon the toggle to withdraw the levers 27 and release the clutch, whereupon the spur gear 23 drives the pinions 4, which, being in mesh with the internal gear 27, reverses the driven shaft, driving it in this instance at one-half speed. The ratio may be according to any specification within the limits of the mechanism. When the control lever 29 is in the perpendicular or intermediate position, both the reverse brake band and the clutch levers are released so that no power or motion will be transmitted from the driving to the driven shaft. This is accomplished by providing for a little lost motion for the collar 32 by the proper adjustment of the lock nuts 36.

I have described my improved reverse gear mechanism in detail and believe that the particular details are possessed of high merit, and desire to claim the same specifically. At the same time there are many features which are capable of modification and I also desire to claim the invention broadly in such particulars, as pointed out in the appended claims.

Having thus described my invention, what I claim as new and desire to secure by Letters Patent is:

1. In a reverse gear mechanism, the combination of a driving shaft, a driven shaft, a spur gear carried by said driving shaft with toothed extension at the inner end, a gear cage with pinions meshing with said spur gear, a ring carried by the said gear cage at its inner end, a case or drum one end of which is closed by the said gear cage and the opposite end closed and extended into a hub provided with a journal bearing for the internal gear hub, an internal gear with teeth longer than the said pinions disposed to mesh therewith, the crown of which is extended in a hub embracing the driven shaft and having a bearing within the case and with a key seat within, a key on said driven shaft engaging said key seat whereby the internal gear is movable axially, a plate within the crown of the internal gear parallel to the gear cage ring, clutch disks toothed to alternately engage the internal gear teeth and the toothed extension of the spur gear, a bearing plate within the casing with axially disposed thrust pins extending beyond the casing, an adjustable collar on the hub of said casing with laterally projecting ears, levers pivoted in said ears disposed to act upon the thrust pins, a sliding sleeve with toggle connections disposed upon the driven shaft to actuate said levers, a suitable control lever connected to said clutch, a brake band around said casing, and connections from the control lever for controlling said brake band, as specified.

2. In a reverse gear mechanism, the combination of a driving shaft, a driven shaft, a spur gear carried by said driving shaft with toothed extension at the inner end, a gear cage with pinions meshing with said spur gear, a ring carried by the said gear cage at its inner end, a case or drum one end of which is closed by the said gear cage and the opposite end closed and extended into a hub provided with a journal bearing for the internal gear hub, an internal gear with teeth longer than the said pinions disposed to mesh therewith, the crown of which is extended in a hub embracing the driven shaft and having a bearing within the case and with a key seat within, a key on said driven shaft engaging said key seat whereby the internal gear is movable axially, clutch disks toothed to alternately engage the internal gear teeth and the toothed extension of the spur gear, a bearing plate within the casing with axially disposed thrust pins extending beyond the casing, an adjustable collar on the hub of said casing with laterally projecting ears, levers pivoted in said ears disposed to act upon the thrust pins, a sliding sleeve with toggle connections disposed upon the driven shaft to actuate said levers, a suitable control lever connected to said clutch, a brake band around said casing, and connections from the control lever for controlling said brake band, as specified.

3. In a reverse gear mechanism, the combination of a driving shaft, a driven shaft, a spur gear carried by said driving shaft with toothed extension at the inner end, a gear cage with pinions meshing with said spur gear, a ring carried by the said gear cage at its inner end, a case or drum one end of which is closed by the said gear cage and the opposite end closed and extended into a hub provided with a journal bearing for the internal gear hub, an internal gear with teeth longer than the said pinions disposed to mesh therewith, the crown of which is extended in a hub embracing the driven shaft and having a bearing within the case and with a key seat within, a key on said driven shaft engaging said key seat whereby the internal gear is movable axially, a plate within the crown of the internal gear parallel to the gear cage ring, clutch disks toothed to alternately engage the internal gear teeth and the toothed extension of the spur gear, a suitable control lever connected to said clutch, a brake band around said casing, and connections from the control lever for controlling said brake band, as specified.

4. In a reverse gear mechanism, the combination of a driving shaft, a driven shaft, a spur gear carried by said driving shaft with toothed extension at the inner end, a gear cage with pinions meshing with said spur gear, a ring carried by the said gear cage at its inner end, a case or drum one end of which is closed by the said gear cage and the opposite end closed and extended into a hub provided with a journal bearing for the internal gear hub, an internal gear with teeth longer than the said pinions disposed to mesh therewith, the crown of which is extended in a hub embracing the driven shaft and having a bearing within the case and with a key seat within, a key on said driven shaft engaging said key seat whereby the internal gear is movable axially, clutch disks toothed to alternately engage the internal gear teeth and the toothed extension of the spur gear, a suitable control lever connected to said clutch, a brake band around said casing, and connections from the control lever for controlling said brake band, as specified.

5. In a reverse gear mechanism, the combination of a driving shaft, a driven shaft, a spur gear carried by said driving shaft with suitable toothed extension, a gear cage with pinions meshing with said spur gear, a clutch ring at the inner end of said cage, an internal gear with teeth extending beyond the said pinions with its crown extended into a hub having sliding engagement with the said driving shaft, clutch disks disposed within the internal gear between the crown thereof and the gear cage, connections to the control lever for actuating said clutch, and a brake mechanism coöperating with said clutch to control the operation of said gearing, as specified.

6. In a reverse gear mechanism, a driving shaft and a driven shaft, a spur gear on one of said shafts with toothed extension at its inner end, an internal gear with toothed extension disposed to coöperate therewith, a gear cage with pinions disposed to mesh and coöperate with said gears, a clutch with alternate toothed disks to engage the internal gear teeth and the spur gear extension, means for actuating said clutch, and a brake mechanism coöperating with said clutch to control the operation of said gearing, as specified.

7. In a reverse gear mechanism, the combination of a spur gear and an internal gear, a gear cage carrying pinions that intermesh and connect the spur gear with the internal gear, a clutch mechanism for locking said internal gear, a case for said parts, a brake band surrounding the said case, a control lever with connections to control said band, a sliding sleeve, and a collar disposed on said sleeve, connections from said collar for controlling said clutch and yielding connection between said collar and lever whereby neutral adjustment is attained, as specified.

In witness whereof, I have hereunto set my hand and seal in the presence of two witnesses.

HARRY J. PERKINS. [L. S.]

Witnesses:
LUELLA G. GREENFIELD,
MARGARET L. GLASGOW.

Copies of this patent may be obtained for five cents each, by addressing the "Commissioner of Patents, Washington, D. C."